United States Patent
Mizobe et al.

(10) Patent No.: US 9,234,265 B2
(45) Date of Patent: Jan. 12, 2016

(54) STEEL FOR INDUCTION HARDENING AND CRANKSHAFT MANUFACTURED USING THE SAME

(75) Inventors: Yuta Mizobe, Tokyo (JP); Hiroaki Tahira, Kizugawa (JP); Ken Yoshino, Nishinomiya (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 27 days.

(21) Appl. No.: 13/819,405

(22) PCT Filed: Jun. 27, 2011

(86) PCT No.: PCT/JP2011/064709
§ 371 (c)(1),
(2), (4) Date: Feb. 27, 2013

(87) PCT Pub. No.: WO2012/029395
PCT Pub. Date: Mar. 8, 2012

(65) Prior Publication Data
US 2013/0156630 A1 Jun. 20, 2013

(30) Foreign Application Priority Data
Aug. 31, 2010 (JP) .................................. 2010-193223

(51) Int. Cl.
| | | |
|---|---|---|
| *C21D 9/30* | (2006.01) | |
| *C22C 38/18* | (2006.01) | |
| *C22C 38/38* | (2006.01) | |
| *C21D 1/06* | (2006.01) | |
| *C21D 1/42* | (2006.01) | |
| *C22C 38/00* | (2006.01) | |
| *C22C 38/60* | (2006.01) | |
| *C22C 38/02* | (2006.01) | |
| *C22C 38/04* | (2006.01) | |
| *C22C 38/06* | (2006.01) | |
| *C22C 38/28* | (2006.01) | |
| *C22C 1/02* | (2006.01) | |
| *F16C 3/06* | (2006.01) | |

(52) U.S. Cl.
CPC . *C22C 38/38* (2013.01); *C21D 1/06* (2013.01); *C21D 1/42* (2013.01); *C21D 9/30* (2013.01); *C22C 1/02* (2013.01); *C22C 38/00* (2013.01); *C22C 38/001* (2013.01); *C22C 38/02* (2013.01); *C22C 38/04* (2013.01); *C22C 38/06* (2013.01); *C22C 38/18* (2013.01); *C22C 38/28* (2013.01); *C22C 38/60* (2013.01); *F16C 3/06* (2013.01); *F16C 2204/62* (2013.01); *F16C 2204/74* (2013.01); *F16C 2223/18* (2013.01)

(58) Field of Classification Search
CPC ...... C22C 38/001; C22C 38/02; C22C 38/04; C22C 38/06; C22C 38/14; C22C 38/18; C22C 38/28; C22C 38/38; C22C 38/60; C21D 1/06; C21D 1/10; C21D 1/42; C21D 9/30; F16C 2204/62; F16C 2204/74; F16C 3/06; F16C 2223/18
USPC ............ 420/87, 104, 120, 126, 128; 148/333; 3/87, 104, 120, 126, 128
See application file for complete search history.

(56) References Cited

U.S. PATENT DOCUMENTS

| | | | |
|---|---|---|---|
| 6,797,231 B2 * | 9/2004 | Matsui et al. .................... | 420/84 |
| 6,838,048 B2 * | 1/2005 | Nishi et al. ...................... | 420/84 |

FOREIGN PATENT DOCUMENTS

| | | |
|---|---|---|
| CN | 101006282 | 7/2007 |
| JP | 61-186419 | 8/1986 |
| JP | 64-36779 | 2/1989 |
| JP | 2000-026933 | 1/2000 |
| JP | 2005-256134 | 9/2005 |
| JP | 2005-264265 | 9/2005 |
| JP | 2007-113063 | 5/2007 |

OTHER PUBLICATIONS

Taira et al., English machine translation of JP 2005-264265 from IDS, Sep. 2005, p. 1-9.*

* cited by examiner

*Primary Examiner* — Jessee Roe
(74) *Attorney, Agent, or Firm* — Clark & Brody

(57) ABSTRACT

There is provided a steel for induction hardening in which cracks are less liable to occur and high hardness and seizure resistance are attained even if a tempering process after induction hardening is omitted. The steel for induction hardening according to the present invention contains, by mass percent, C: 0.20 to 0.34%, Si: at most 0.20%, Mn: 0.75 to 2.0%, P: at most 0.03%, S: at most 0.20%, Cr: 0.05 to 1.2%, Ti: at least 0.002% and less than 0.030%, Al: 0.005 to 0.04%, and N: 0.0040 to 0.020%, the balance being Fe and impurities, and satisfies Formula (1):

$$1.20 \leq Mn+Cr \leq 2.10 \quad (1)$$

where the content (mass %) of each element is substituted for each of the symbols of elements in Formula (1).

2 Claims, No Drawings

STEEL FOR INDUCTION HARDENING AND CRANKSHAFT MANUFACTURED USING THE SAME

TECHNICAL FIELD

The present invention relates a steel for induction hardening and a crankshaft manufactured using the same. More particularly, the present invention relates to a steel for induction hardening that is used for a crankshaft manufactured by induction hardening, and a crankshaft manufactured using the steel for induction hardening.

BACKGROUND ART

Some crankshaft is manufactured by being subjected to induction hardening and tempering followed by grinding. Induction hardening induces residual stress in steel. The residual stress causes cracks such as quenching cracks and grinding cracks. Tempering reduces residual stress and restrains the occurrence of cracks.

If a tempering process can be omitted, the manufacturing cost goes down. However, cracks attributable to the residual stress induced at the time of induction hardening are liable to occur. For this reason, there has been a demand for a steel for induction hardening in which cracks are less liable to occur even if a tempering process is omitted in the manufacturing process of a crankshaft.

JP61-186419A, JP2000-26933A, JP2005-256134A, and JP2007-113063A disclose steels which are used for manufacturing a hot forged product and a crankshaft, and in which cracks attributable to induction hardening are less liable to occur.

In the method for manufacturing a driveshaft disclosed in JP61-186419A, the occurrence of quenching cracks attributable to induction hardening is restrained by reducing the C content in a steel product. In JP61-186419A, the steel product further contains B to compensate the decrease in hardenability caused by the reduction in the C content.

In the steel for hot forging disclosed in JP2000-26933A, at least 0.04 wt % of Ti is contained to change the mode of sulfide, whereby the machinability after forging is improved, and the occurrence of grinding cracks at the time of grinding is restrained.

The steel material for crankshaft disclosed in JP2005-256134A contains at least 0.4 mass % of Si. A large amount of Si contained reduces the shrinkage at the time when carbides are produced by heat generated at the time of grinding, and restrains the occurrence of grinding cracks.

The hot-forged part disclosed in JP2007-113063A has a chemical composition such that a formula of fn2=521−353C−22Si−25Mn−8Cu−17Ni−18Cr−26Mo is at least 300. By making the formula of fn2 at least 300, the occurrence of quenching cracks is restrained.

DISCLOSURE OF THE INVENTION

However, like the steel product disclosed in JP61-186419A, in the steel for induction hardening that contains B, the variations in hardenability are large, so that the quality is less liable to be stabilized. The steel for hot forging disclosed in JP2000-26933A contains much Ti, so that the production cost is high. The steel materials disclosed in JP2005-256134A and JP2007-113063A contain much Si. For this reason, the amount of formation of scale increases. Therefore, it is more favorable that the occurrence of cracks caused by induction hardening can be restrained by any other method different from the methods in the above-described Patent Documents.

Further, it is more preferable that the hardness of crankshaft is higher. Also, the pin of crankshaft is inserted into the large end portion of a connecting rod, and rotates with respect to the inner surface of the large end portion of the connecting rod via a sliding bearing. For this reason, the surface of crankshaft is required to have excellent seizure resistance. Therefore, the steel for induction hardening used for manufacturing the crankshaft is required to have high hardness and seizure resistance.

It is an objective of the present invention to provide a steel for induction hardening in which cracks are less liable to occur and high hardness and excellent seizure resistance are attained even if a tempering process after induction hardening is omitted.

The steel for induction hardening according to one embodiment of the present invention contains, by mass percent, C: 0.20 to 0.34%, Si: at most 0.20%, Mn: 0.75 to 2.0%, P: at most 0.03%, S: at most 0.20%, Cr: 0.05 to 1.2%, Ti: at least 0.002% and less than 0.030%, Al: 0.005 to 0.04%, and N: 0.0040 to 0.020%, the balance being Fe and impurities, and satisfies Formula (1):

$$1.20 \leq Mn + Cr \leq 2.10 \quad (1)$$

where the content (mass %) of each element is substituted for each of the symbols of elements in Formula (1).

For the steel for induction hardening according to one embodiment of the present invention, cracks are less liable to occur and high hardness and excellent seizure resistance are attained even if a tempering process after induction hardening is omitted.

The crankshaft according to one embodiment of the present invention is manufactured by induction-hardening the above-described steel for induction hardening. The crankshaft may be manufactured by being not tempered.

BEST MODE FOR CARRYING OUT THE INVENTION

An embodiment of the present invention will now be described in detail. Hereinafter, symbol % concerning a chemical element means percent by mass.

[Outline of Steel for Induction Hardening According to this Embodiment]

The present inventors conducted examinations and studies to improve the cracking resistance, hardness, and seizure resistance of the steel for induction hardening that has not been tempered. As the result, the present inventors obtained the findings described below.

The cracks (quenching cracks and grinding cracks) occurring in the steel for induction hardening when a crankshaft is manufactured are attributable to residual stress induced in the steel at the time of induction hardening and grinding. In order to reduce the residual stress, to decrease the carbon (C) content in the steel is effective. If the C content is decreased, the change in volume of steel caused by heat can be restrained, so that the residual stress can be reduced. Therefore, cracks are less liable to occur. That is, the cracking resistance is improved. If the C content is at most 0.34%, the occurrence of cracks can be restrained even if a tempering process is omitted.

(2) Carbon (C) increases the hardness of steel. Therefore, if the C content is decreased, the hardness of the steel for induction hardening decreases. Therefore, in place of C, manganese (Mn) and chromium (Cr) satisfying Formula (1) are contained to increase the hardness of steel.

(3) If the thermal conductivity of steel decreases, the seizure resistance of steel decreases. Silicon (Si) decreases the thermal conductivity of steel. If the Si content is at most 0.20%, the thermal conductivity of steel can be kept high, and excellent seizure resistance can be attained.

Based on the above-described findings, the present inventors completed the steel for induction hardening according to this embodiment. Hereunder, the steel for induction hardening according to this embodiment is described in detail.

[Chemical Composition]

The steel for induction hardening according to this embodiment has the chemical composition described below.

C: 0.20 to 0.34%

Carbon (C) increases the strength and hardness of steel. On the other hand, if the C content is too high, the change in volume of steel caused by heat increases, so that residual stress is liable to be induced in steel. For this reason, cracks are liable to occur. Therefore, the C content is 0.20 to 0.34%. The C content is preferably 0.28 to 0.34, further preferably 0.30 to 0.33.

Si: at most 0.20%

Silicon (Si) lowers the thermal conductivity of steel, and decreases the seizure resistance of steel. On the other hand, if the Si content is too high, the amount of scale formed at the time of hot forging becomes large, so that the surface texture of the forged steel becomes rough. Therefore, it is more preferable that the Si content is lower. The Si content is at most 0.20%. The Si content is preferably at most 0.18%, further preferably at most 0.10%.

Mn: 0.75 to 2.0%

Manganese (Mn) dissolves in steel, and enhances the strength and toughness of steel. Further, Mn increases the hardness of the steel before being induction-hardened. Further, Mn forms MnS, and restrains the production of FeS. By restraining the production of FeS, the hot ductility of steel is improved, and cracks are made less liable to occur at the time of forging. On the other hand, if the Mn content is too high, bainite is produced. Bainite decreases the machinability of steel. For this reason, the production of bainite is unfavorable. Also, if the Mn content is too high, the hardness of steel becomes too high, and cracks are liable to occur. Further, Mn decreases the thermal conductivity of steel. Therefore, the Mn content is 0.75 to 2.0%. The Mn content is preferably 1.10 to 1.70%, further preferably 1.30 to 1.60%.

P: at most 0.03%

Phosphorus (P) is an impurity. Phosphorus decreases the hot ductility. Further, P decreases the cracking resistance at the time of quenching. Therefore, it is more preferable that the P content is lower. The P content is at most 0.03%. The P content is preferably at most 0.020%, further preferably at most 0.010%.

S: at most 0.20%

Sulfur (S) is an impurity. However, if S is contained, MnS is formed, and the machinability of steel is improved. On the other hand, if the S content is too high, the hot workability of steel deteriorates. Further, if the S content is too high, the number of sulfides in steel is increased, and grinding cracks are liable to occur. Therefore, the S content is at most 0.20%. In the case where the advantageous effect of improving the machinability of steel is achieved, the lower limit of the S content is preferably at least 0.02%. The S content is further preferably 0.02 to 0.07%.

Cr: 0.05 to 1.2%

Chromium (Cr) enhances the strength and hardness of steel. Specifically, Cr decreases the $A_{c3}$ transformation point. On account of the decrease of the $A_{c3}$ transformation point, the outer layer of steel is liable to come to be of a uniform martensitic structure in induction hardening. Also, Cr enhances the hardness of the steel before being induction-hardened. On the other hand, if the Cr content is too high, bainite is produced on the base metal before being induction-hardened. Since bainite decreases the machinability, the production of bainite is unfavorable. Therefore, the Cr content is 0.05 to 1.2%. The Cr content is preferably 0.10 to 0.50%, further preferably 0.15 to 0.30%.

Ti: at least 0.002% and less than 0.030%

Titanium (Ti) forms nitrides and carbo-nitrides, and makes the crystal grains fine by means of pinning effect. By making the crystal grains fine, the ductility and toughness of steel are improved, and the cracks attributable to induction hardening are made less liable to occur. On the other hand, if the Ti content is too high, coarse nitrides are formed, and the machinability of steel is decreased. Further, the manufacturing cost is increased. Therefore, the Ti content is at least 0.002% and less than 0.030%. The Ti content is preferably at least 0.005% and less than 0.030%.

Al: 0.005 to 0.04%

Aluminum (Al) deoxidizes steel. Further, Al forms nitrides, and makes the crystal grains fine by means of pinning effect. By making the crystal grains fine, the ductility and toughness of steel are improved, and cracks attributable to induction hardening are made less liable to occur. On the other hand, if the Al content is too high, the toughness of steel rather decreases. Therefore, the Al content is 0.005 to 0.04%. The Al content is preferably 0.008 to 0.030%. The Al content in this embodiment is the content of acid-soluble Al (Sol.Al).

N: 0.0040 to 0.020%

Nitrogen (N) combines with Al and Ti to forms nitrides and carbo-nitrides. These nitrides and carbo-nitrides make the crystal grains fine by means of pinning effect. By making the crystal grains fine, the ductility and toughness of steel are improved, and cracks attributable to induction hardening are made less liable to occur. On the other hand, if the N content is too high, defects such as voids are liable to occur in steel. Therefore, the N content is 0.0040 to 0.020%. The N content is preferably 0.0080 to 0.020%.

The balance of chemical composition of the steel for induction hardening according to this embodiment consists of Fe and impurities. The impurities described herein are elements that mixedly enter from ore and scrap used as the raw materials of steel, the environment of production process, and the like. In this embodiment, the impurities are, for example, copper (Cu), nickel (Ni), molybdenum (Mo), and oxygen (O).

The chemical composition of the steel for induction hardening according to this embodiment satisfies Formula (1):

$$1.20 \leq Mn+Cr \leq 2.10 \tag{1}$$

where the content (mass %) of each element is substituted for each of the symbols of elements in Formula (1).

If the total of the Mn content and the Cr content is at least 1.20%, high hardness can be attained even if the C content is low. On the other hand, if the total of the Mn content and the Cr content exceeds 2.10%, bainite is produced in steel, and the machinability of steel decreases. Further, the hardness becomes too high, and cracks are liable to occur.

[Micro-Structure]

The micro-structure of the steel for induction hardening according to this embodiment is a ferritic-pearlitic structure or a pearlitic structure.

[Manufacturing Method]

One example of the manufacturing method for a crankshaft using the steel for induction hardening according to this embodiment is explained.

Molten steel having the above-described chemical composition is produced. The molten steel is cast into a cast piece by the continuous casting process. The molten steel may be cast into an ingot by the ingot-making process. The cast piece or the ingot may be turned into a billet or a steel bar by hot working.

Next, the cast piece, ingot, billet, or steel bar is hot-forged and allowed to cool in the air to produce an intermediate product having a rough shape of crankshaft. Then, the intermediate product of crankshaft is induction-hardened under the well-known conditions.

The intermediate product of crankshaft having been induction-hardened is not tempered. That is, the tempering process is omitted. The intermediate product of crankshaft that is not tempered is ground into a predetermined shape by machining, whereby a crankshaft is manufactured.

The crankshaft is manufactured using the steel for induction hardening having the above-described chemical composition. Therefore, after the induction hardening has been performed, cracks are less liable to occur even if the tempering process is omitted. Further, because the Mn and Cr contents satisfy Formula (1), the steel for induction hardening has a high hardness. Further, because of low content of Si, the steel for induction hardening is excellent in seizure resistance.

EXAMPLES

The micro-structure, hardness, thermal conductivity, and cracking resistance of each of the steels for induction hardening having various chemical compositions were examined.

[Test Method]

Each of the steels of marks A to X having the chemical compositions given in Table 1 was melted in a vacuum induction heating furnace to produce molten steel. From the molten steel, a columnar ingot was produced. The produced ingot had a weight of 50 kg and an outside diameter of 150 mm.

TABLE 1

| Mark | Chemical composition (unit: mass %, balance being Fe and impurities) | | | | | | | | | F value | Micro-structure | Hardness (Hv) | Grain size No. | Thermal conductivity (W/(m·K)) | Crack |
| | C | Si | Mn | P | S | Cr | Ti | Al | N | | | | | | |
|---|---|---|---|---|---|---|---|---|---|---|---|---|---|---|---|
| A | 0.28 | 0.08 | 1.36 | 0.017 | 0.044 | 0.05 | 0.002 | 0.015 | 0.0181 | 1.41 | Ferrite, pearlite | 213 | 3 | 46.6 | Absent |
| B | 0.30 | 0.13 | 1.53 | 0.018 | 0.053 | 0.10 | 0.002 | 0.014 | 0.0161 | 1.63 | Ferrite, pearlite | 220 | 3 | 43.4 | Absent |
| C | 0.32 | 0.17 | 1.60 | 0.017 | 0.077 | 0.15 | 0.002 | 0.015 | 0.0176 | 1.75 | Ferrite, pearlite | 231 | 3 | 41.0 | Absent |
| D | 0.32 | 0.09 | 0.78 | 0.004 | 0.060 | 0.48 | 0.002 | 0.006 | 0.0048 | 1.26 | Ferrite, pearlite | 203 | 3 | 46.4 | Absent |
| E | 0.33 | 0.10 | 0.78 | 0.004 | 0.060 | 0.99 | 0.002 | 0.009 | 0.0047 | 1.77 | Ferrite, pearlite | 218 | 2 | 44.8 | Absent |
| F | 0.32 | 0.10 | 0.79 | 0.004 | 0.060 | 1.01 | 0.002 | 0.040 | 0.0053 | 1.80 | Ferrite, pearlite | 208 | 3.5 | 45.2 | Absent |
| G | 0.31 | 0.10 | 1.01 | 0.004 | 0.070 | 0.48 | 0.002 | 0.005 | 0.0173 | 1.49 | Ferrite, pearlite | 217 | 4 | 45.4 | Absent |
| H | 0.29 | 0.11 | 1.00 | 0.004 | 0.060 | 1.01 | 0.002 | 0.038 | 0.0178 | 2.01 | Ferrite, pearlite | 222 | 4 | 45.1 | Absent |
| I | 0.29 | 0.11 | 0.99 | 0.004 | 0.062 | 1.01 | 0.021 | 0.040 | 0.0185 | 2.00 | Ferrite, pearlite | 209 | 5.5 | 45.1 | Absent |
| J | 0.30 | 0.11 | 1.53 | 0.016 | 0.020 | 0.08 | 0.002 | 0.014 | 0.0161 | 1.61 | Ferrite, pearlite | 222 | 3 | 43.4 | Absent |
| K | 0.39 | 0.54 | 1.48 | 0.020 | 0.062 | 0.13 | 0.002 | 0.002 | 0.0167 | 1.61 | Ferrite, pearlite | 258 | 1.5 | 28.3 | Present |
| L | 0.38 | 0.03 | 1.45 | 0.008 | 0.051 | 0.12 | 0.002 | 0.002 | 0.0144 | 1.57 | Ferrite, pearlite | 233 | 1.5 | 43.0 | Present |
| M | 0.30 | 0.98 | 1.54 | 0.018 | 0.061 | 0.10 | 0.002 | 0.020 | 0.0178 | 1.64 | Ferrite, pearlite | 238 | 4 | 20.2 | Absent |
| N | 0.18 | 0.12 | 1.53 | 0.019 | 0.065 | 0.05 | 0.002 | 0.014 | 0.0168 | 1.58 | Ferrite, pearlite | 170 | 3 | 48.7 | Absent |
| O | 0.30 | 0.13 | 2.40 | 0.017 | 0.053 | 0.06 | 0.002 | 0.013 | 0.0161 | 2.46 | Ferrite, pearlite, bainite | 256 | 3 | 38.7 | Present |
| P | 0.30 | 0.12 | 0.02 | 0.018 | 0.053 | 0.07 | 0.002 | 0.014 | 0.0159 | 0.09 | Ferrite, pearlite | 153 | 3 | 51.6 | Absent |
| Q | 0.30 | 0.13 | 1.44 | 0.016 | 0.067 | 2.00 | 0.002 | 0.014 | 0.0161 | 3.44 | Ferrite, pearlite, bainite | 260 | 3 | 40.5 | Present |
| R | 0.30 | 0.10 | 1.38 | 0.016 | 0.070 | 0.03 | 0.002 | 0.016 | 0.0160 | 1.41 | Ferrite, pearlite | 190 | 3 | 45.2 | Absent |
| S | 0.30 | 0.12 | 1.53 | 0.018 | 0.250 | 0.07 | 0.002 | 0.017 | 0.0163 | 1.60 | Ferrite, pearlite | 222 | 3 | 43.4 | Present |
| T | 0.30 | 0.13 | 1.44 | 0.018 | 0.014 | 0.10 | 0.002 | 0.016 | 0.0020 | 1.54 | Ferrite, pearlite | 225 | 1 | 43.9 | Present |
| U | 0.30 | 0.12 | 1.44 | 0.018 | 0.056 | 0.05 | 0.002 | 0.001 | 0.0167 | 1.49 | Ferrite, pearlite | 198 | 1.5 | 43.9 | Present |
| V | 0.30 | 0.11 | 1.32 | 0.018 | 0.058 | 0.08 | 0.001 | 0.013 | 0.0162 | 1.40 | Ferrite, pearlite | 195 | 1.5 | 44.6 | Present |
| W | 0.32 | 0.13 | 1.80 | 0.015 | 0.049 | 0.60 | 0.002 | 0.015 | 0.0165 | 2.40 | Ferrite, pearlite, bainite | 270 | 3 | 57.7 | Present |

TABLE 1-continued

| | Chemical composition (unit: mass %, balance being Fe and impurities) | | | | | | | | | | Micro-structure | Hardness (Hv) | Grain size No. | Thermal conductivity (W/(m·K)) | |
|---|---|---|---|---|---|---|---|---|---|---|---|---|---|---|---|
| Mark | C | Si | Mn | P | S | Cr | Ti | Al | N | F value | | | | | Crack |
| X | 0.32 | 0.12 | 0.80 | 0.014 | 0.051 | 0.35 | 0.002 | 0.012 | 0.0177 | 1.15 | Ferrite, pearlite | 188 | 3 | 55.5 | Absent |

In the "F value" column in Table 1, the value of F expressed by following Formula (2) is described.

$$F = Mn + Cr \quad (2)$$

in which, for each of the symbols of elements in Formula (2), the content (mass %) of each element is substituted.

Referring to Table 1, the chemical composition of each of the steels of marks A to J was within the range of the chemical composition of the steel for induction hardening according to this embodiment, and satisfied Formula (1).

On the other hand, the chemical composition of each of the steels of marks K to X was out of the range of the chemical composition of the steel for induction hardening according to this embodiment, or did not satisfy Formula (1). Specifically, the C content, the Si content, and the Al content of mark K, the C content and the Al content of mark L, the Si content of mark M, the C content of mark N, the Mn contents of marks O and P, the Cr contents of marks Q and R, the S content of mark S, the N content of mark T, the Al content of mark U, and the Ti content of mark V were, respectively, out of the range of the chemical composition of the steel for induction hardening in accordance with this embodiment. Also, the F value of mark P was smaller than the lower limit of Formula (1), and the F values of marks O and Q each exceeded the upper limit of Formula (1).

The chemical compositions of marks W and X each were within the range of the chemical composition of the steel for induction hardening according to this embodiment. However, the F value of mark W exceeded the upper limit of Formula (1), and the F value of mark X was smaller than the lower limit of Formula (1).

The ingot of each mark was hot-forged to produce a forged product. Specifically, each ingot was heated to 1250° C. in a well-known heating furnace. The heated ingot was hot-forged to produce a round-bar shaped forged product (hereinafter, referred simply to as a round bar) having an outside diameter of 65 mm. The finishing temperature at the time of hot forging was 1000° C. After hot forging, the round bar was allowed to cool in the air.

[Structure Observation Test]

The round bar of each mark having been allowed to cool was cut perpendicularly to the axial direction to sample a test specimen. The normal of the cross sectional surface of the test specimen was in the axial direction of the round bar. The cross sectional surface of the test specimen was polished. After polishing, the cross sectional surface was corroded with a nital etching reagent. After corroding, the micro-structure at the R/2 position (a position determined by dividing the distance between the center point and the outer periphery of the cross sectional surface (circular shape) into two equal parts) of the corroded cross sectional surface was observed under an optical microscope having a magnification of ×400.

[Grain Size Measurement Test]

In the structure observation test, the austenite grain size number was further determined at optional five visual fields at the R/2 position of the cross sectional surface of the round bar of each mark by using the reference chart of grain size in JIS G0551. At this time, a region surrounded by pro-eutectoid ferrite was recognized as one crystal grain. For each mark, the average value of the austenite grain size numbers determined at five visual fields was defined as the austenite grain size number of each mark.

[Hardness Test]

Each round bar was cut perpendicularly to the axial direction. After the cross sectional surface had been mirror polished, the Vickers hardness (Hv) was measured at optional three points at the R/2 position of the cross sectional surface in conformity to JIS Z2244. The test force was 98.07N. The average value of the obtained three Vickers hardnesses was defined as the hardness of each mark.

[Crack Test]

The round bar of each mark was turned by the well-known turning method to produce a ring test specimen (hereinafter, referred simply to as a ring) having an outside diameter of 60 mm, an inside diameter of 40 mm, and a width of 15 mm. The outer peripheral surface of each ring was induction-hardened. In the induction hardening, the outer peripheral surface of the ring was heated for 1.2 second under the conditions of 150 kHz of frequency and 100 kW. After heating, the ring was water-cooled.

After the induction hardening has been performed, the outer surface of ring was ground by cylindrical plunge grinding. A grindstone of trade name of "80A 80N 8V201" manufactured by Kure Grinding Wheel K.K. was used. The grindstone had an outer diameter of 405 mm, an inner diameter of 152.4 mm, and a width of 25 mm. The grindstone circumferential speed at the time of grinding was 60 m/s, and the infeed speed was 0.5 mm/min. The allowance was 0.3 mm dia/cut. That is, the outer surface of ring was ground until the outer diameter of each ring reached 59.7 mm.

The outer surface of the ground ring was immersed in 4.1% hydrochloric acid for 10 minutes. After immersion, the presence of crack was checked visually by the fluorescent magnetic particle flaw detection test.

[Thermal Conductivity Measurement Test]

A test specimen having a diameter of 5 mm and a thickness of 1 mm was sampled from the R/2 position of each round bar. By using the sampled test specimen, the thermal conductivity (W/(m·K)) of the test specimen of each mark was measured by the laser flash method in conformity to JIS R1611.

[Test Results]

The test results are given in Table 1. In the "Micro-structure" column in Table 1, the micro-structures observed in the structure observation test are given. In the "Hardness" column, the hardnesses (Hv) obtained by the hardness test are given. In the "Grain size No." column, the grain size numbers obtained by the grain size measurement test are given. In the "Thermal conductivity" column, the thermal conductivities (W/(m·K)) obtained by the thermal conductivity measurement test are given. In the "Crack" column, the crack test results are given. The "Absent" indicates that no crack was confirmed. The "Present" indicates that a crack was confirmed.

Referring to Table 1, the chemical compositions of marks A to J each were within the range of the chemical composition of the steel for induction hardening according to this embodiment, and the F values of marks A to J each satisfied Formula (1). Therefore, the hardness at the R/2 position of the round bar of each mark was at least 200 Hv in Vickers hardness. Also, in each of marks A to J, the thermal conductivity was at least 40 W/(m·K), and an excellent seizure resistance was exhibited. Further, the grain size number was at least 2.0, and in the crack test, no crack was confirmed on the test specimen of each mark. The micro-structure was a ferritic-pearlitic structure in each of marks A to J.

On the other hand, the C contents of marks K and L each exceeded the upper limit of the C content of the steel for induction hardening according to this embodiment. Therefore, in the crack test, a crack was confirmed. Also, the Si contents of marks K and M each exceeded the upper limit of the Si content of the steel for induction hardening according to this embodiment. Therefore, the thermal conductivities of marks K and M each were lower than 40 W/(m·K), and it was presumed that the seizure resistance was low.

The C content of mark N was less than the lower limit of the C content of the steel for induction hardening according to this embodiment. Therefore, the Vickers hardness was lower than 200 Hv.

The Mn content of mark O exceeded the upper limit of the Mn content of the steel for induction hardening in accordance with this embodiment. Also, the F value exceeded the upper limit of Formula (1). Therefore, in the structure observation, bainite was observed. Further, the Vickers hardness was too high, being 256 Hv, a crack was confirmed in the crack test, and the thermal conductivity was also lower than 40 W/(m·K).

The Mn content of mark P was less than the lower limit of the Mn content of the steel for induction hardening according to this embodiment, and the F value was smaller than the lower limit of Formula (1). Therefore, the Vickers hardness was lower than 200 Hv.

The Cr content of mark Q exceeded the upper limit of the Cr content of the steel for induction hardening according to this embodiment, and the F value exceeded the upper limit of Formula (1). Therefore, bainite was confirmed in the structure observation. Further, a crack was confirmed in the crack test.

The Cr content of mark R was less than the lower limit of the Cr content of the steel for induction hardening according to this embodiment. Therefore, the Vickers hardness was lower than 200 Hv.

The S content of mark S exceeded the upper limit of the S content of the steel for induction hardening according to this embodiment. Therefore, a crack was confirmed in the crack test. It is presumed that the reason for this was the production of much sulfides.

The N content of mark T, the Al content of mark U, and the Ti content of mark V were less than the lower limits of the N content, the Al content, and the Ti content of the steel for induction hardening according to this embodiment, respectively. Therefore, the austenite grain size number was less than 2.0, and a crack was confirmed in the crack test. Also, the Vickers hardnesses of marks U and V each were lower than 200 Hv.

The chemical compositions of marks W and X each were within the range of the chemical composition of the steel for induction hardening according to this embodiment. However, the F value of mark W exceeded the upper limit of Formula (1), so that a crack was confirmed in the crack test. Also, the F value of mark X was smaller than the lower limit of Formula (1), so that the Vickers hardness was lower than 200 Hv.

The above is the explanation of an embodiment of the present invention. The above-described embodiment is merely an illustration for carrying out the present invention. Therefore, the present invention is not limited to the above-described embodiment, and the above-described embodiment can be carried out by being changed as appropriate without departing from the spirit and scope of the present invention.

The invention claimed is:

1. A crankshaft comprising an induction hardened and hot forged steel, containing, by mass percent, C: 0.20 to 0.34%, Si: at most 0.20%, Mn: 0.75 to 2.0%, P: at most 0.03%, S: at most 0.20%, Cr: 0.05 to 1.2%, Ti: at least 0.002% and less than 0.030%, Al: 0.014 to 0.04%, and N: 0.0040 to 0.020%, the balance being Fe and impurities, and satisfying Formula (1):

$$1.20 \leq Mn+Cr \leq 2.10 \quad (1)$$

where the content (mass %) of each element is substituted for each of the symbols of elements in Formula (1).

2. The crankshaft according to claim 1, which is manufactured by being not tempered.

* * * * *